United States Patent
Chopko et al.

(12) 
(10) Patent No.: US 6,223,546 B1
(45) Date of Patent: May 1, 2001

(54) ELECTRICALLY POWERED TRANSPORT REFRIGERATION UNIT

(76) Inventors: Robert A. Chopko, 25 Shriver Dr., Baldwinsville, NY (US) 13027;
Kenneth B. Barrett, 6205 The Hamlet, Jamesville, NY (US) 13078

( * ) Notice: Subject to any disclaimer, the term of this patent is extended or adjusted under 35 U.S.C. 154(b) by 0 days.

(21) Appl. No.: 09/295,871

(22) Filed: Apr. 21, 1999

(51) Int. Cl.$^7$ ........................................................ B60H 1/32

(52) U.S. Cl. ........................ 62/243; 62/297; 62/323.3

(58) Field of Search ............................ 62/239, 243, 297, 62/323.3

(56) References Cited

U.S. PATENT DOCUMENTS

| | | | |
|---|---|---|---|
| 4,551,986 | * | 11/1985 | Anderson et al. ............. 62/239 |
| 5,226,294 | * | 7/1993 | Mayer ........................... 62/323.1 |
| 5,247,808 | * | 9/1993 | Yoshida et al. ............... 62/228.4 |
| 5,678,512 | * | 10/1997 | Colton .......................... 123/2 |
| 5,804,946 | * | 9/1998 | Gaubatz et al .............. 322/1 |
| 5,916,253 | * | 6/1999 | Amer et al. ................. 62/259.1 |
| 5,960,637 | * | 10/1999 | Stevens et al. ............. 62/77 |

* cited by examiner

*Primary Examiner*—William Doerrler
*Assistant Examiner*—Melvin Jones

(57) ABSTRACT

The present invention provides for a transport refrigeration unit of the type configured to be mounted on the front wall of a transport trailer. The transport trailer is adapted to be connected to and towed by a motorized tractor. The connected trailer and tractor define between them a predetermined envelope bounded by the tractor swing radius and the trailer front wall. The refrigeration unit includes a structural support framework configured to be attached to the front wall of the trailer. An outer cover is configured to be supported by the framework and to be within the predetermined envelope. All of the following components of the refrigeration unit are supported by the framework and contained within the outer cover: a compressor, a condenser heat exchanger, an evaporator heat exchanger, at least one fan assembly having at least one electric fan motor configured to provide air flow over one of the heat exchangers, and an integrally mounted unitary engine driven generator assembly configured to selectively produce at least one A.C. voltage at one or more frequencies. The generator assembly is capable of producing sufficient power to operate the compressor drive motor and the at least one fan motor. In a preferred embodiment, the generator assembly is a synchronous generator and the compressor drive motor and the at least one fan motor are configured to be directly coupled to the generator and to operate at a voltage and frequency produced by the synchronous generator.

10 Claims, 13 Drawing Sheets

ELECTRICALLY POWERED TRANSPORT REFRIGERATION UNIT

This invention relates to transport refrigeration systems. More particularly, this invention relates to an all electric truck trailer refrigeration unit that receives its compressor drive motor power and all other electrical power from a single on-board engine driven synchronous generator, and that may be mounted on the front wall of a tractor trailer.

Transport refrigeration systems for a standardized truck trailer having on-board regulated power necessary to operate certain components such as system controls, motors and related devices are known in the art. Some of these refrigeration systems are also known to employ synchronous generators, such as that employed in the GOLDEN EAGLE transport refrigeration unit manufactured by the CARRIER TRANSICOLD DIVISION of the CARRIER CORPORATION of Farmington, Conn.

Equipment used in truck trailer refrigeration units must be accommodated within the limited space bounded by the tractor swing radius and the trailer front wall. In the prior art, such transport refrigeration applications have included an on-board, small power output generator or alternator and regulator apparatus which has been limited to providing power to a portion of the system power consuming apparatus, such as fan motors and system controls. On-board generators that are sufficiently large enough to simultaneously provide all the power needed by the transport refrigeration system, including the power to run compressor drive motor, have heretofore been too large to be accommodated within the aforementioned available space, and would also be too heavy and too costly even if they were available, for serious consideration for use in conventional truck trailer transport refrigeration systems.

Synchronous generators, which are small enough to meet the aforementioned size and weight requirements, are not configured to meet the overall transport refrigeration system power requirements. Large synchronous generators of sufficient power capability to fully power a truck trailer transport refrigeration system have been too large, too heavy and too costly to meet on-board size and weight requirements. Therefore, use of conventional synchronous generators to provide the entire motor and control system power for transport refrigeration units has not heretofore been a viable option in the transport refrigeration industry.

Generally, transport refrigeration systems such as those used on truck trailers, have employed belt driven and/or mechanically linked shaft driven compressor units rather than electrical motor driven compressor units. Such systems have also usually included belt driven, or otherwise mechanically linked fan powering systems. Alternatively, various types of generators or alternators and regulator apparatus have provided a portion of the power required by the refrigeration system within a package size that is sufficiently small to meet the size constraints of trailer transport refrigeration systems. Conventional refrigeration system generator units have not been capable of generating sufficient output power to simultaneously power the compressor drive motor and all other motors and electrical devices of a transport refrigeration system. As a result, such systems have required compressor units which are driven, through a mechanical coupling, by an engine such as a diesel. The engine also drives the refrigeration system fans and other components through additional mechanical drives utilizing pulleys, v-belts and the like.

A disadvantage of these known engine driven refrigeration systems is the need to provide suitable coupling apparatus between the engine and the compressor and other mechanically linked apparatus, as stated herein above. Generally, the engine power is coupled to the compressor via a compressor drive shaft that necessarily requires a fluid tight shaft seal to ensure that refrigerant does not leak out of the compressor from around the drive shaft. In view of the above, those skilled in the art of transport refrigeration have been aware that the aforesaid drive shaft seals deteriorate with time and usage, resulting in loss of system refrigerant due to leakage around the compressor drive shaft, creating a long felt need for a viable solution to this problem. Further, the mechanical linkages introduce vibration to these systems, require a reservation of a routing path for the linkage between the engine and its powered units, and require a maintenance cost overhead, that would otherwise not be necessary.

Still needed, but not available with transport refrigeration systems presently known in the art is a compact, light weight, all electric transport refrigeration system with on-board electrical power generating capacity which is capable of providing multi-phase and/or single-phase power to simultaneously supply the electrical requirements of the refrigeration system compressor motor as well as all other motors and electrical devices. Such a refrigeration system cannot exceed the spatial boundaries presently imposed by more conventional transport refrigeration systems that employ belt driven and/or other mechanically linked shaft driven motors and devices, e.g. compressors, evaporator fans, condenser fans and the like.

A particularly onerous restraint on spatial boundaries available for transport refrigeration units mounted to the front of truck trailer transport refrigeration system is that which arises from the European standard for overall length of tractor/trailer combinations. Specifically, the European standard for such a combination is that it not exceed 16.5 meters (approximately 54 feet) from the nose of the truck tractor unit to the rear of the trailer unit. It is further considered desirable for a tractor trailer combination satisfying this requirement to have a volumetric capacity within the trailer, which will allow the trailer to receive a total of thirty-three (33) European pallet loads of goods. As a result, it will be appreciated that it is desirable to reduce the distance between the back of the cab of the truck trailer and the front of the refrigeration unit to a minimum.

SUMMARY OF THE INVENTION

The present invention provides for a transport refrigeration unit of the type configured to be mounted on the front wall of a transport trailer. The transport trailer is adapted to be connected to and towed by a motorized tractor. The connected trailer and tractor define between them a predetermined envelope bounded by the tractor swing radius and the trailer front wall. The refrigeration unit includes a structural support framework configured to be attached to the front wall of the trailer. An outer cover is configured to be supported by the framework and to be within the predetermined envelope. All of the following components of the refrigeration unit are supported by the framework and contained within the outer cover: a compressor, a condenser heat exchanger unit, an evaporator heat exchanger unit, at least one fan assembly having at least one electric fan motor configured to provide air flow over one of the heat exchanger units, and an integrally mounted unitary engine driven generator assembly configured to selectively produce at least one A.C. voltage at one or more frequencies. The generator assembly is capable of producing sufficient power to operate the compressor drive motor and the at least one fan motor.

In a preferred embodiment, the generator assembly is a synchronous generator and the compressor drive motor and the at least one fan motor are configured to be directly coupled to the generator and to operate at a voltage and frequency produced by the synchronous generator.

BRIEF DESCRIPTION OF THE DRAWINGS

The invention may be better understood and its objects and advantages will become apparent to those skilled in the art by reference to the accompanying drawings, in which.

While the above-identified drawing figures set forth the preferred embodiment, other embodiments of the present invention are also contemplated, as noted in the discussion. In all cases, this disclosure presents illustrative embodiments of the present invention by way of representation and not limitation. Numerous other modifications and embodiments may be devised by those skilled in the art which fall within the scope and spirit of the principles of this invention.

DETAILED DESCRIPTION OF THE PREFERRED EMBODIMENT(S)

The preferred embodiments described herein address the long felt need by those in the transport refrigeration industry to provide a highly efficient, compact, reliable and cost effective truck trailer refrigeration system having an electrical power system that is simple in design, fits within the allotted volume bounded by the tractor swing radius and the trailer front wall along with the remainder of the refrigeration system, and simultaneously provides electrical power for the compressor, the evaporator and condenser fans, and the other electrical systems of the refrigeration system.

Figure 1:
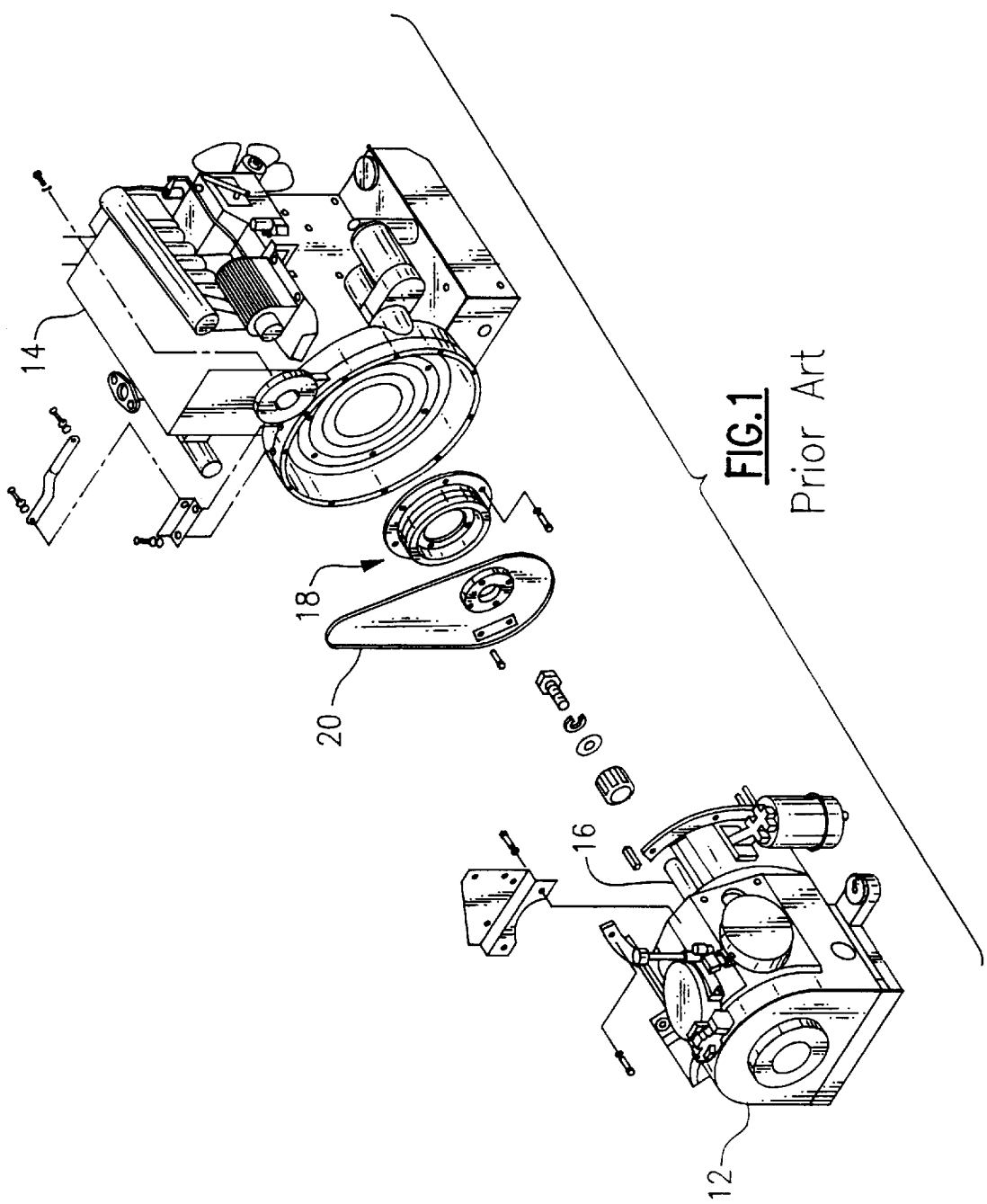
FIG. 1 is an exploded perspective view of a truck trailer refrigeration system compressor unit having a drive shaft that is coupled to an external engine by means of an external drive in a manner familiar to those skilled in the art of transport refrigeration.

Referring to FIG. 1, a prior art truck trailer refrigeration system compressor unit 12 has a drive shaft 16 that is coupled to a separate engine 14 via a pulley assembly 18 (or other mechanical linkage) familiar to those skilled in the art of transport refrigeration. Other types of compressor drive systems are also well known. For example, transport refrigeration systems are known for driving a compressor with a v-belt 20 and an external electric motor that can take its power from a remote electrical source. These known transport refrigeration systems have attendant shortcomings in that they are all susceptible to leakage of refrigerant around the compressor drive shaft seal because of seal deterioration over time and with continued use. In addition, they are susceptible to v-belt wear and failure over time and with continued use.

Figure 2:
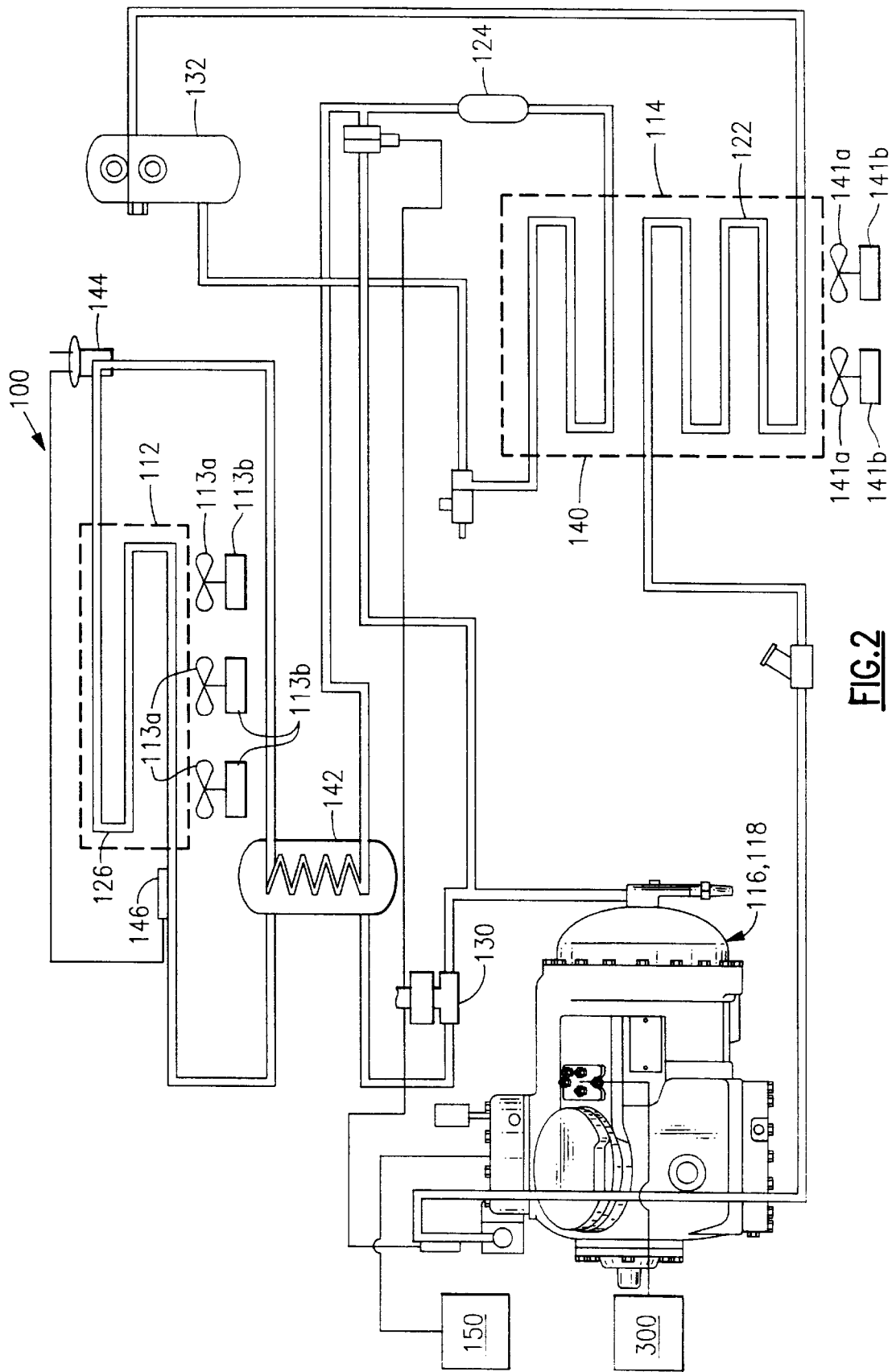
FIG. 2 is a schematic diagram illustrating a trailer refrigeration system having a compressor with an integrated electric drive motor that is implemented in accordance with one embodiment of the present invention.

Referring to FIG. 2, a trailer refrigeration system is schematically illustrated with a compressor 116 of the type which is commonly referred to as a semi-hermetic compressor. The compressor 116 has the compressing mechanism, an electric compressor motor 118 and an interconnecting drive shaft all sealed within a common housing, thereby preventing loss of refrigerant from around the compressor drive shaft over time. In a preferred embodiment, the compressor is a variant of an 06D compressor manufactured by Carrier Corporation. The compressor has six cylinders and a displacement of 600 cc and is provided with two unloaders, each for selectively unloading a pair of cylinders under selective load conditions. As will be appreciated from the description that follows, a properly designed synchronous generator 300 is capable of fully powering the internal electric motor 118 of the compressor as well as satisfying all other electrical requirements of the system.

A brief description of refrigeration system 100 operation is set forth below for purposes of illustrating the significance of providing a highly reliable compressor 116 structure and to provide a background which will facilitate an understanding of the description of the embodiments that follow thereafter. Operation of the refrigeration system 100 can best be understood by starting at the compressor 116, where the suction gas (refrigerant) enters the compressor and is compressed to a higher temperature and pressure. Refrigerant gas then moves into the air-cooled condenser 114. Air flowing across a group of condenser coil fins and tubes 122 cools the gas to its saturation temperature. The air flow across the condenser is energized by one or more condenser fans 141a powered by condenser fan motors 141b. By removing latent heat, the gas condenses to a high pressure/high temperature liquid and flows to a receiver 132 that provides storage for excess liquid refrigerant during low temperature operation. From the receiver 132, the liquid refrigerant passes through a subcooler heat exchanger 140, through a filter-drier 124 that keeps refrigerant clean and dry, then to a heat exchanger 142 that increases the refrigerant subcooling, and finally to a thermostatic expansion valve 144.

As the liquid refrigerant passes through the orifice of the expansion valve 144, some of it vaporizes into a gas (flash gas). Return air from the refrigerated space flows over the heat transfer surface of the evaporator 112. As refrigerant flows through the tubes 126 in the evaporator 112, the remaining liquid refrigerant absorbs heat from the return air, and in so doing, is vaporized. The air flow across the evaporator is energized by one or more evaporator fans 113a powered by evaporator fan motors 113b. The vapor then flows through a suction modulation valve 130 back to the compressor 116 and integral drive motor, 118. A thermostatic expansion valve bulb or sensor 146 is located on the evaporator outlet tubing 126. The bulb 146 is intended to control the thermostatic expansion valve 144, thereby controlling refrigerant superheat at the evaporator outlet tubing 126.

The compressor drive motor 118 power consumption is maximum during start-up operation when the compressor 116 accelerates and may be required to pump refrigerant which is in a state of abnormally high temperature and pressure. This circumstance has limited the usage and availability of a totally electric refrigeration system, including electric power supply, which could be contained within the space bounded by the swing radius of the tractor and the trailer front wall. The inventors of the present invention realized that by limiting power consumption of the compressor drive motor 118 during start-up operation and by designing a novel higher output generator, a totally electric refrigeration system, including electric power supply, could be configured to fit within the aforementioned space.

In order to accomplish such limitations, a programmed controller 150 is provided which, in addition to conventionally controlling the refrigeration system 100, unloads the compressor 116 during system start-up. This reduced compressor load may be realized, alternatively, by unloading a portion of the sections of a modular compressor, or by bypassing a portion of the sections of a modular compressor, or by routing a portion of the refrigerant in a bypass of the compressor. Compressor unloading continues through system start-up until the compressor 116 has accelerated to a speed within its steady state speed operating range and then, alternatively, until a predetermined time has expired or until the system refrigerant pressures and temperatures have achieved a state within the control range of the programmed controller 150. To further limit the maximum power requirement of the system 100 during start-up, the programmed controller 150, in the preferred embodiment, does not energize the fan motors 113b, 141b until the compressor drive motor 118 has achieved a speed within its steady state speed operating range.

The synchronous generator of the present invention, to be discussed presently, generates a voltage at a frequency, where both vary linearly with the angular velocity of an engine. The engine speed is unregulated, except for a preferred embodiment engine governor. However, in the preferred embodiment, the system is designed to operate at either of two engine speeds, the selection of which is determined by the programmed controller to meet the required conditions of the refrigerated space. Specifically, the synchronous generator is configured to have an output frequency of 65 hz at an engine speed of 1950 r.p.m. and an output frequency of 45 hz at an engine speed of 1350 r.p.m. All of the motors 113b, 141b, and 118 are selected such that they operate at the wide range of synchronous generator output frequencies and voltages.

Figure 3A:
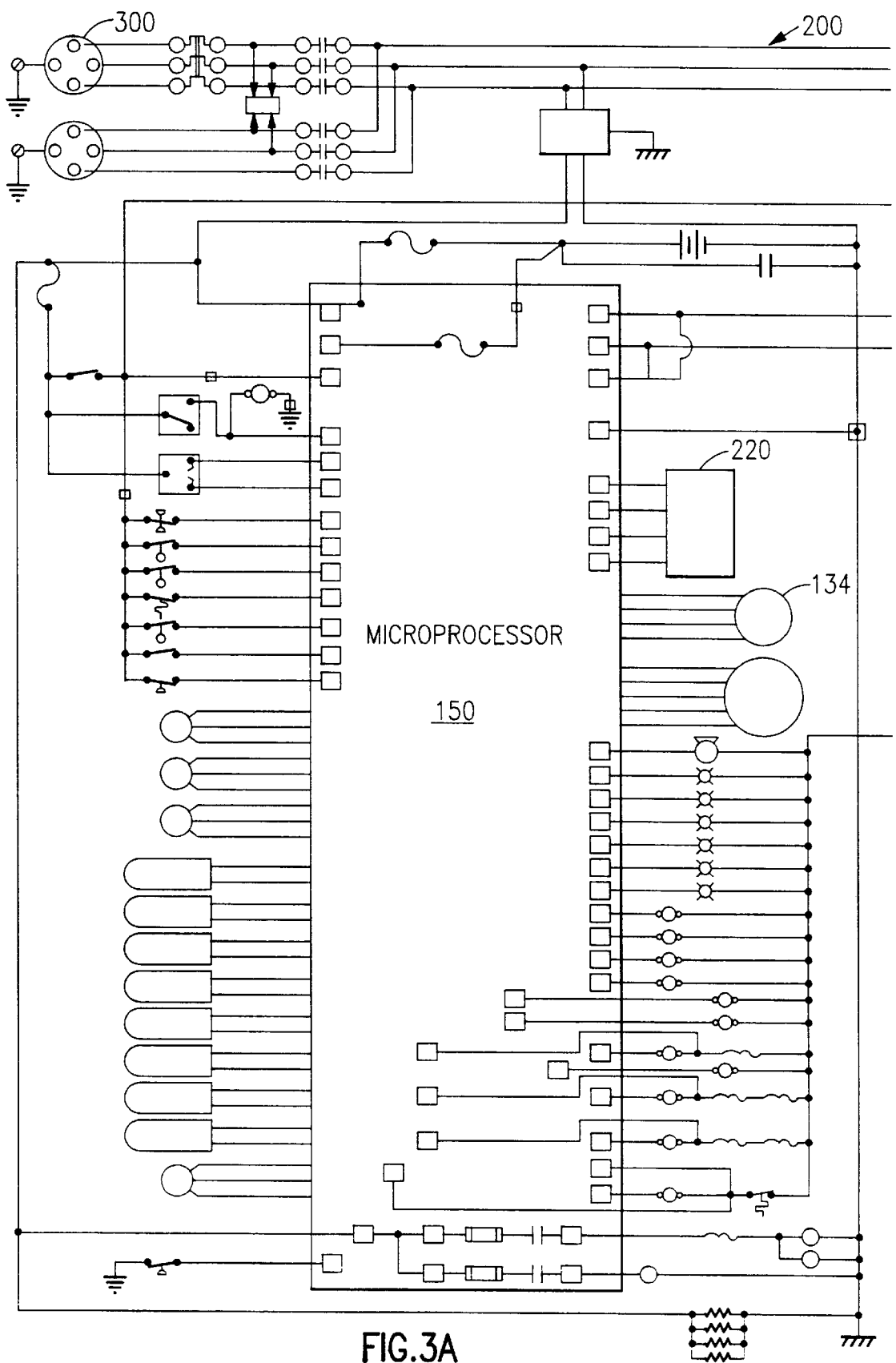
FIGS. 3A, B illustrate one embodiment of an electrical system having a single synchronous generator in accordance with the present invention, that is suitable to supply all multi-phase, single-phase and control system power requirements for a transport refrigeration system as shown.

FIGS. 3A, B illustrate one embodiment of an electrical power system 200 having a single synchronous power generator 300 that is suitable to supply all multi-phase, single-phase and control system power requirements for a transport refrigeration system as shown. The electrical power system 200 is a radical departure from those systems known in the art and that use conventional open drive compressor configurations and structures such as discussed herein above with reference to FIG. 1. In the past synchronous generators have been solely limited to providing regulated power to certain power electrical devices and/or small horsepower motors in refrigeration systems. It can be seen that the unique synchronous generator 300 employed in the electrical system 200 is used to provide power to the compressor drive motor 118, electrically powered condenser fan motors 141b, electrically powered evaporator fan motors 113b, serpentine heater elements 214, evaporator coil heaters 216, and a host of electrical and electronic control devices such as the suction modulation valve solenoid 134, the display/keyboard module 220 and the like.

Figure 4:
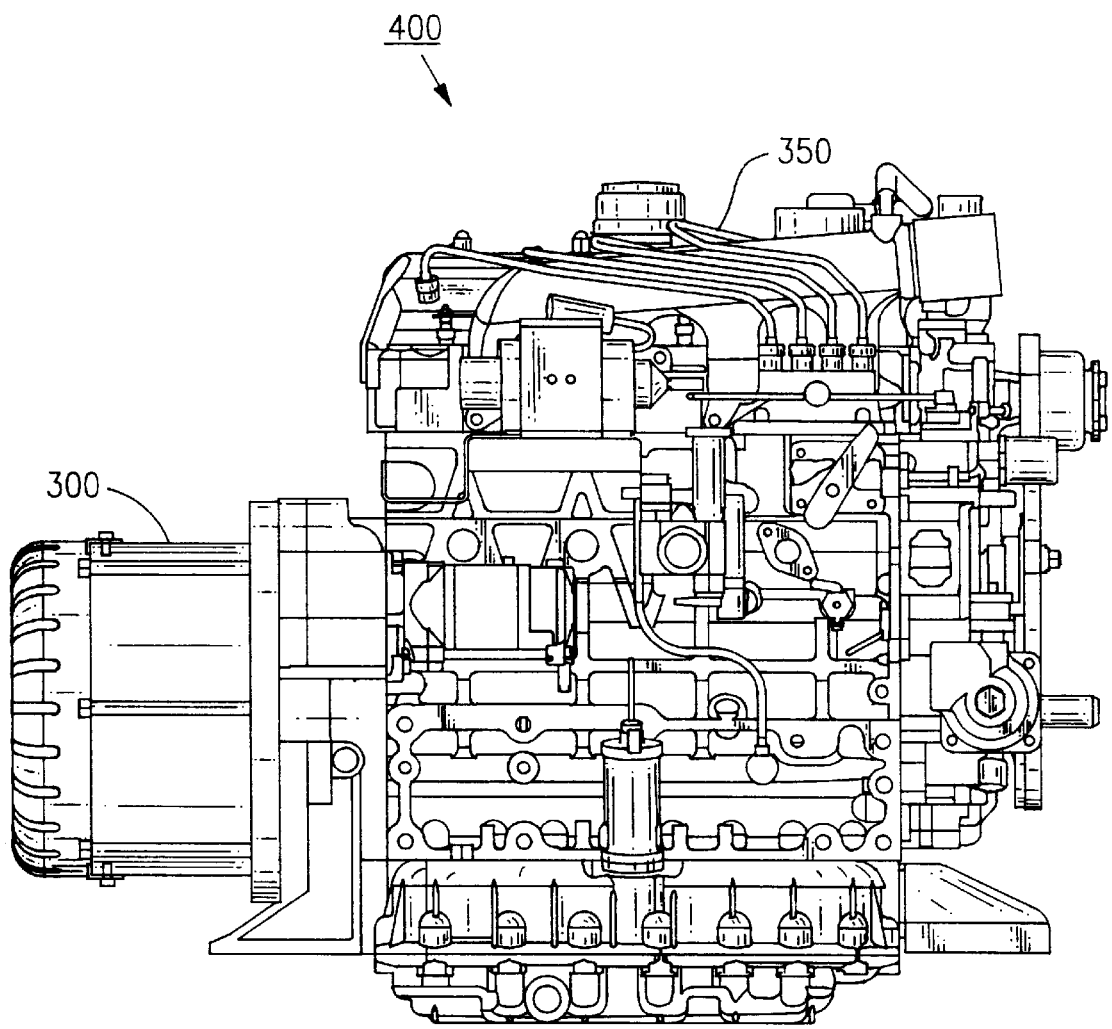
FIG. 4 is a side view of an engine driven synchronous generator in accordance with one embodiment of the present invention.
Figure 5:
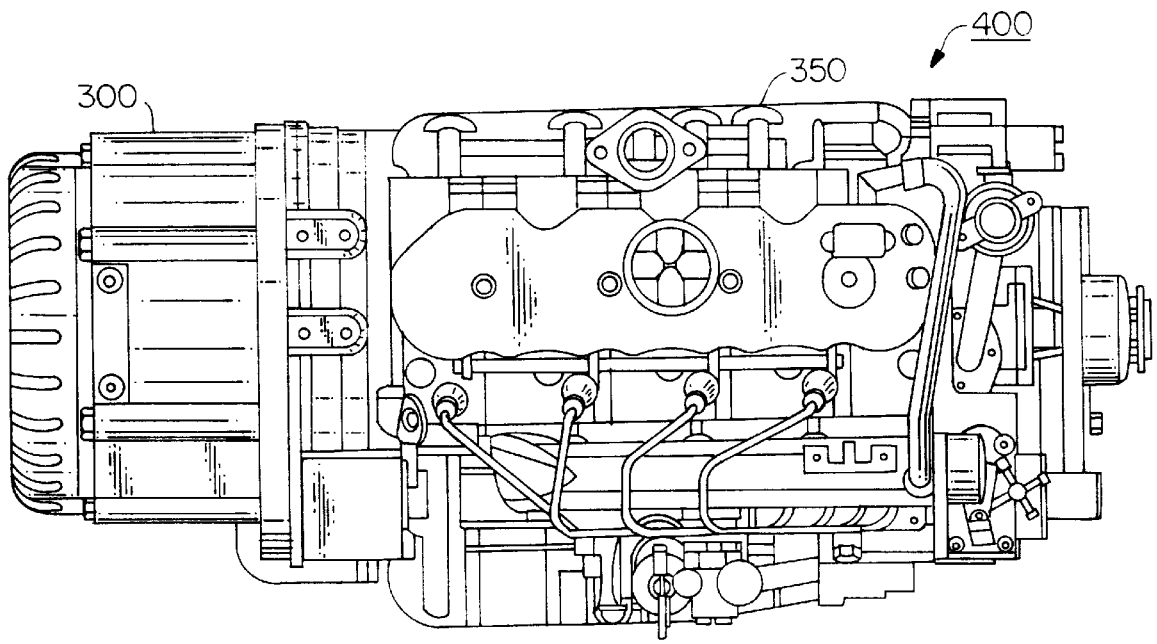
FIG. 5 is a top view of the engine driven synchronous generator shown in FIG. 4.
Figure 6:
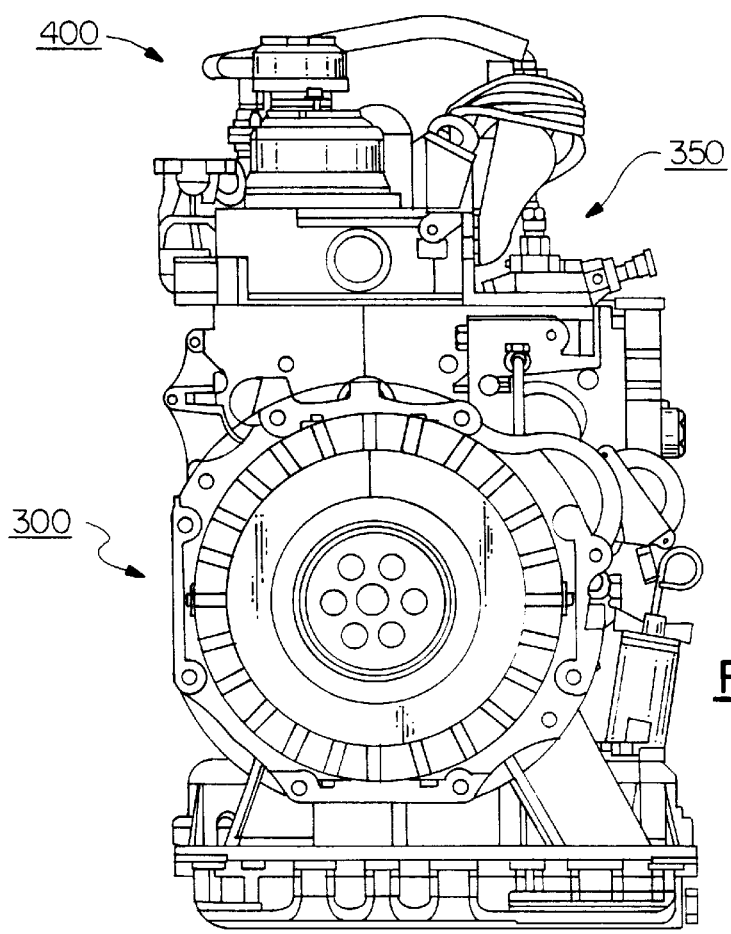
FIG. 6 is an end view of the engine driven synchronous generator shown in FIG. 4.

FIGS. 4, 5 and 6 respectively illustrate a side view, a top view and an end view of an integrally mounted engine driven synchronous generator unit 400 in accordance with one embodiment of the present invention. The structure of the integrally mounted engine driven synchronous generator unit 400 is unique in several details. It is a significant advantage that the physical size of the synchronous generator 300 is sufficiently small to allow it to be easily coupled directly to the drive shaft of an engine 350. As a result, a single rotatable drive shaft, which is common to both the synchronous generator 300 and the engine 350, allows the synchronous generator 300 and the engine 350 to be configured to operate as a single unitary integrally mounted unit 400. In this manner, the spatial requirements of the unitary engine driven synchronous generator unit 400 are minimized. The synchronous generator has an overall length, that when combined with the engine 350, fits within the relatively narrow frame of a conventional transport refrigeration unit.

With reference to FIGS. 5 and 6, it can be seen that the synchronous generator unit 300 also has a width that is less than that of the engine 350. It is therefore assured that the novel engine driven synchronous generator unit 400 structure does not increase the thickness of the transport refrigeration unit.

Figure 3B:
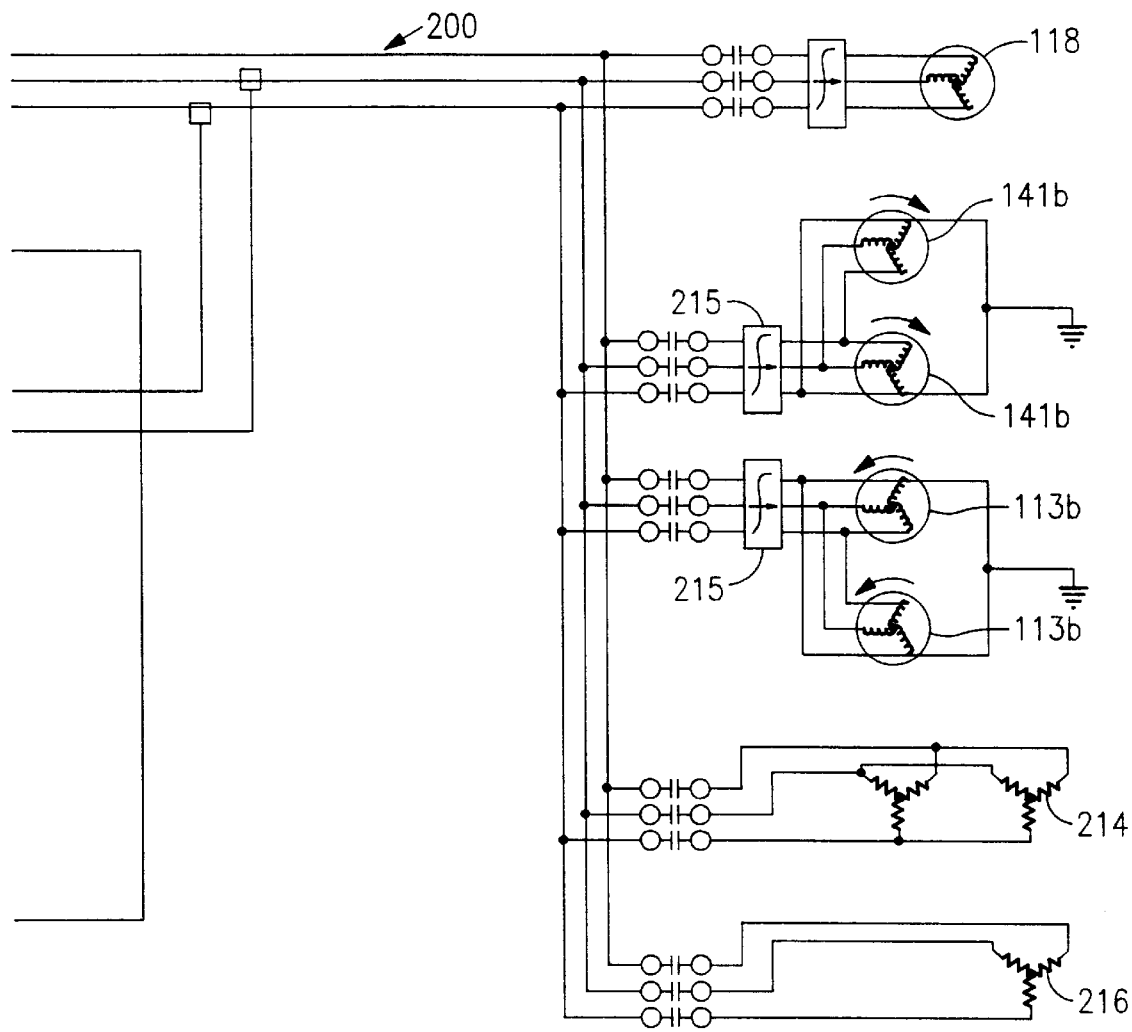
Figure 3B:
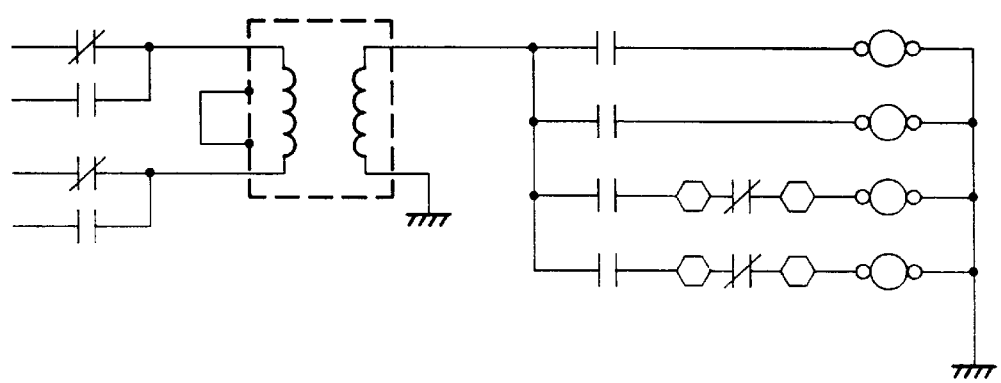

To meet the complete power requirements of a transport refrigeration system such as disclosed in FIGS. 2, 3A and 3B, conventional synchronous generators, that are known in the art and that have sufficient regulated power output capability, are much too large to allow construction of a unitary engine driven synchronous generator unit 400 such as that shown in FIG. 4. The present inventors have thus provided a unique structure for use with such transport refrigeration units that represents a radical departure and a significant advancement in the transport refrigeration art. The integrally mounted engine driven synchronous generator unit 400 is, therefore, the first engine driven power unit of its kind which is small enough to fit within a trailer refrigeration unit, provides the total multi-phase, single-phase and control system power necessary to operate a conventional transport refrigeration system, and eliminates the necessity for compressor drive shaft seals, belt drives and/or other mechanical linkages which may otherwise be required to drive refrigeration system components.

Figure 7:
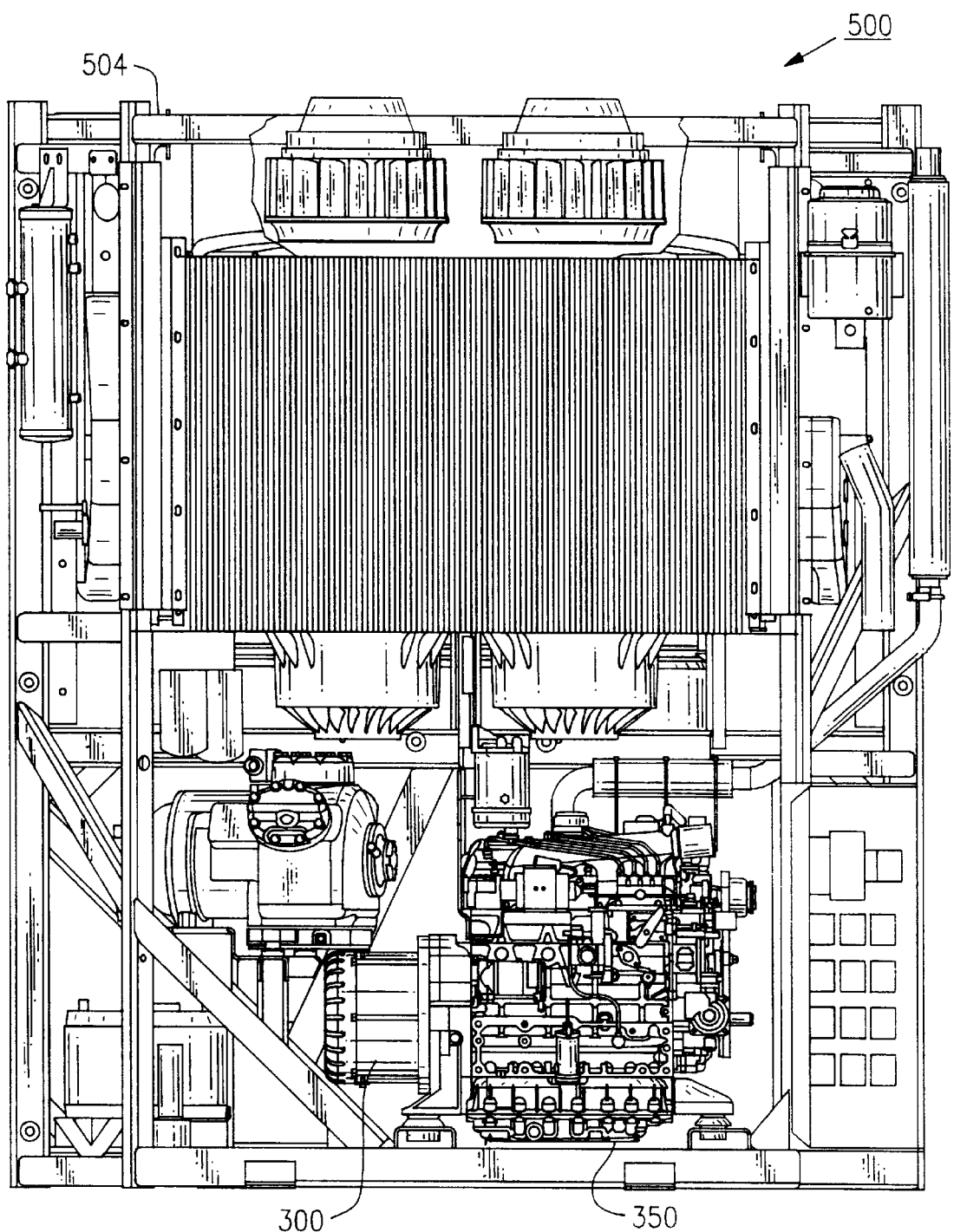
FIG. 7 is a front view of a transport refrigeration unit that includes the engine driven synchronous generator depicted in FIGS. 4, 5 and 6 in accordance with one embodiment of the present invention.
Figures 8, 9:
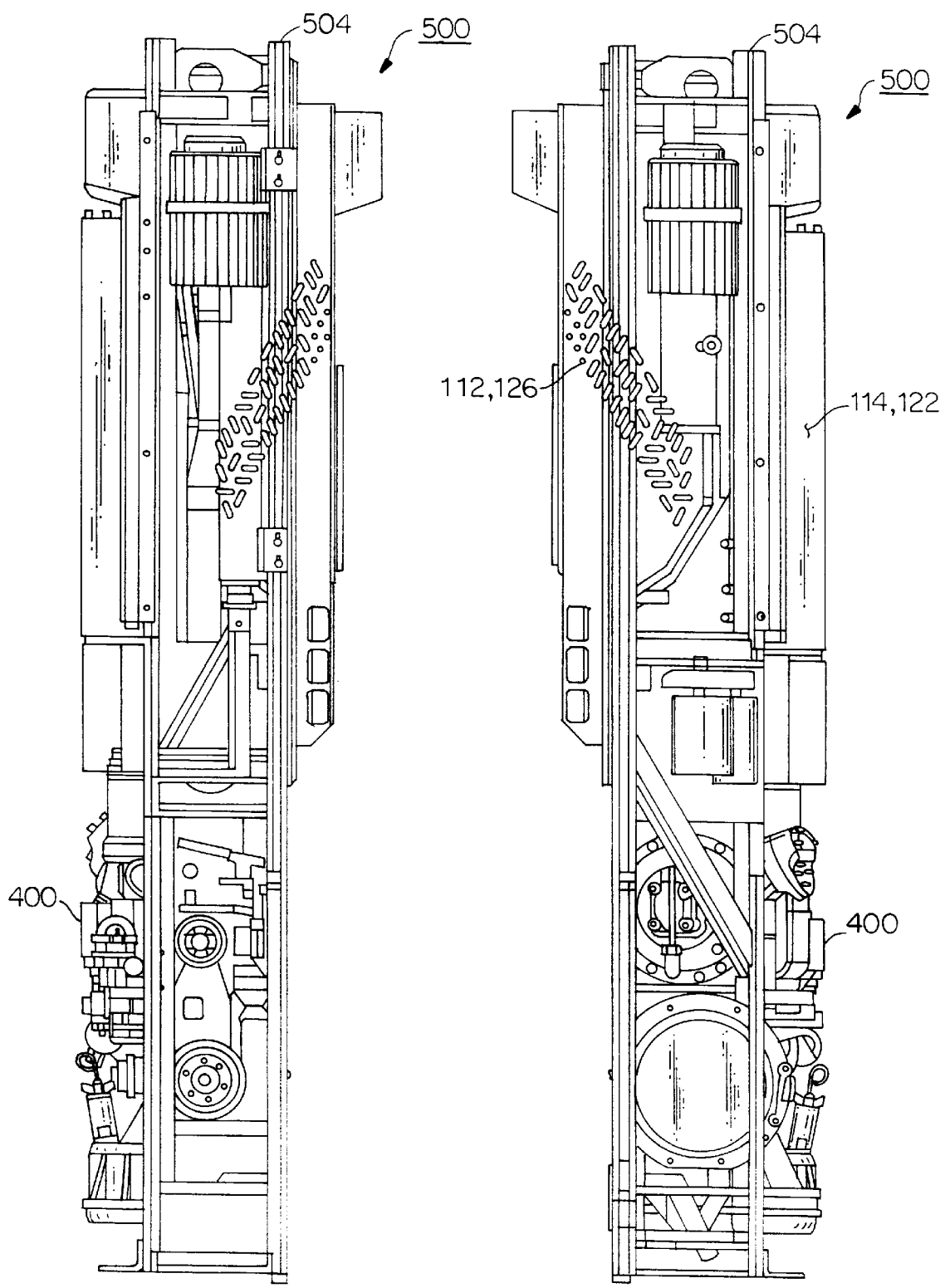
FIG. 8 is a frontal right side view of the transport refrigeration unit shown in FIG. 7.
FIG. 9 is a frontal left side view of the transport refrigeration unit shown in FIG. 7.

Moving now to FIGS. 7, 8 and 9, a truck trailer refrigeration unit 500 is seen to include the synchronous generator 300 and the diesel engine 350 depicted in FIGS. 4, 5 and 6 in accordance with one embodiment of the present invention. The refrigeration unit 500 includes the compressor/ drive motor unit 116, 118 and all other refrigeration system components depicted in FIG. 2. All multi-phase power, single phase power and control system power for the refrigeration unit 500 is provided by the single unitary engine driven synchronous generator 400.

Figure 10:
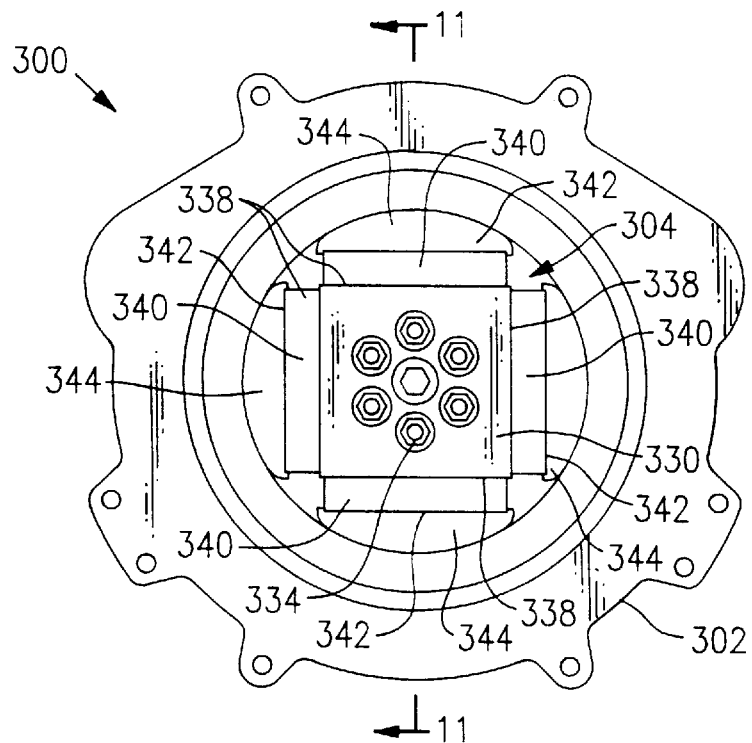
FIG. 10 is a front view of a synchronous generator depicting an internal structure in accordance with one preferred embodiment of the present invention.
Figure 11:
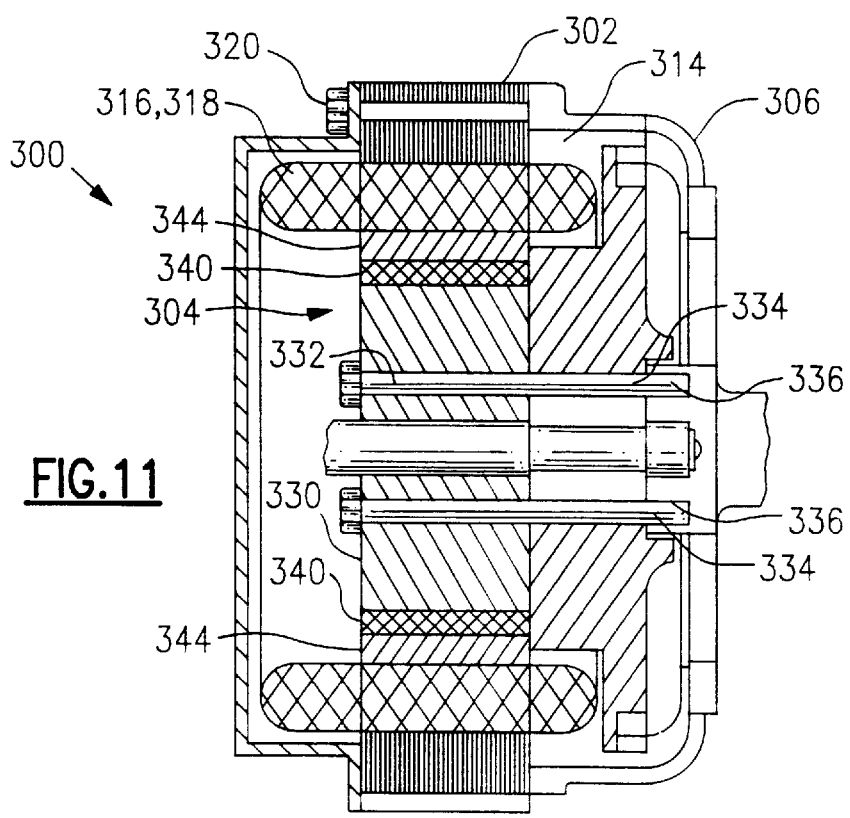
FIG. 11 is a side cutaway view of the synchronous generator illustrated in FIG. 10.
Figure 12:
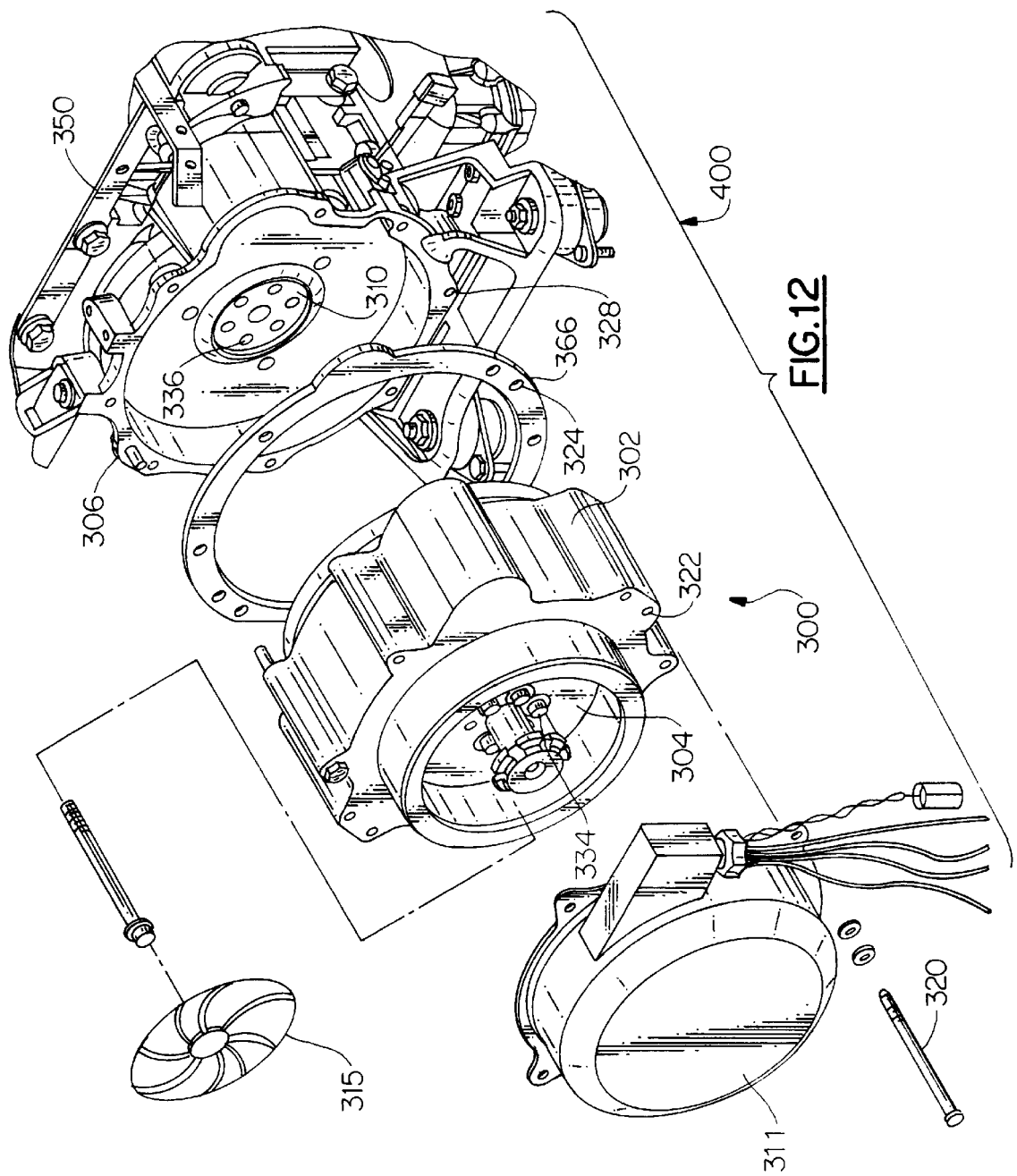
FIG. 12 is an exploded perspective view of an engine driven synchronous generator of the type depicted in FIGS. 10 and 11.
Figure 13:
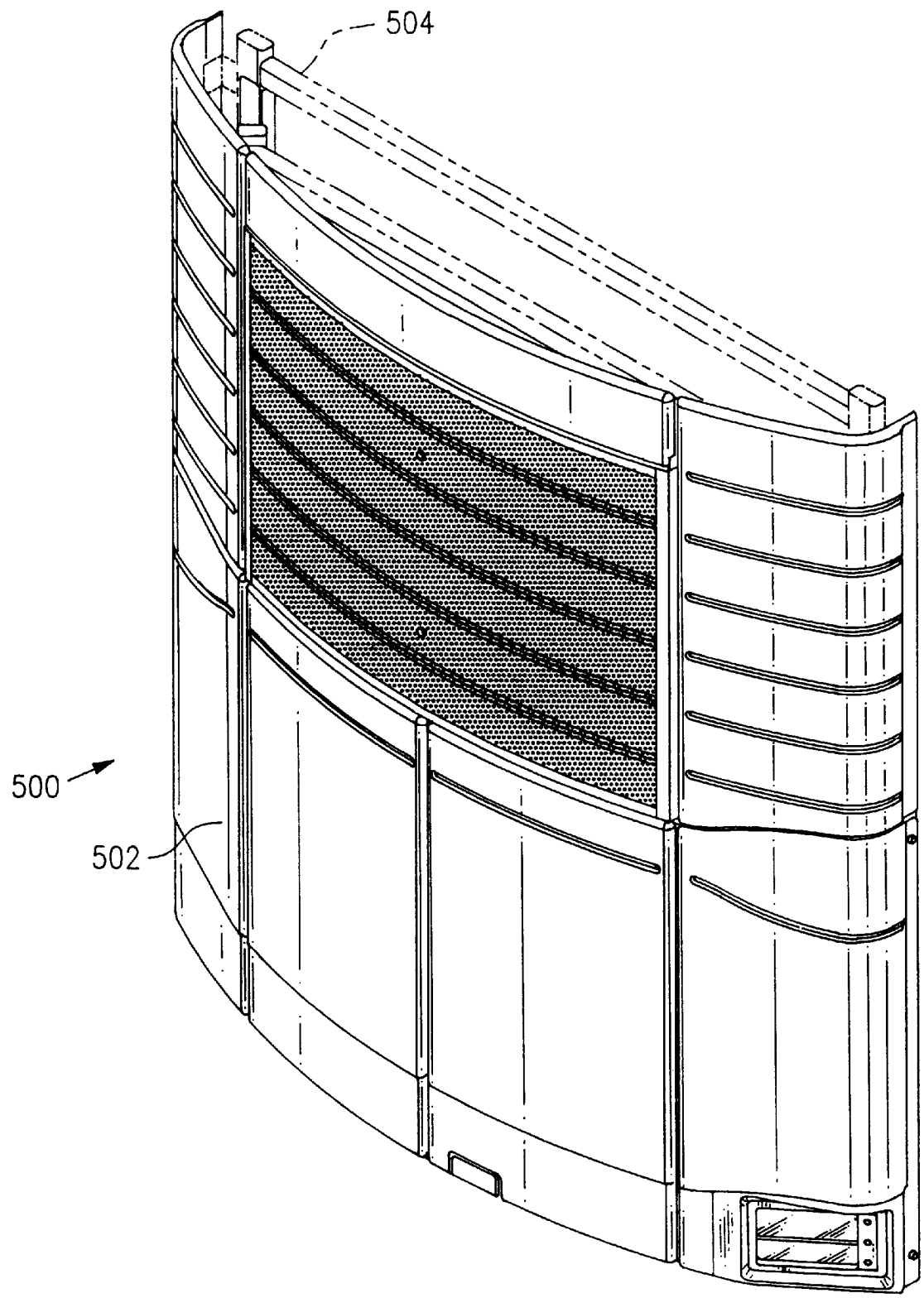
FIG. 13 is a perspective view of an outer cover for use with a transport refrigeration unit of the type illustrated in FIGS. 7, 8 and 9.
Figure 14:
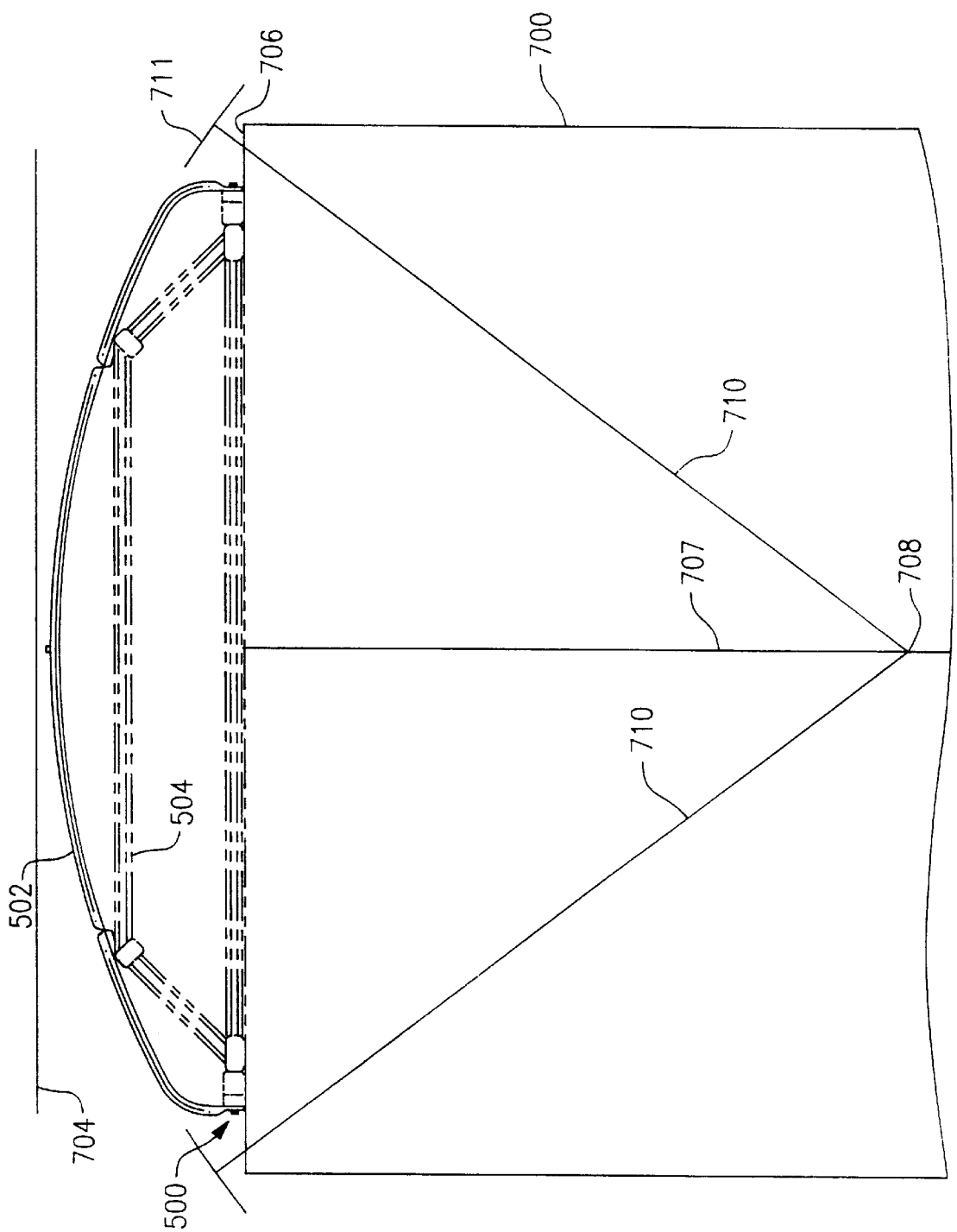
FIG. 14 is a top view of the transport refrigeration unit cover illustrated in FIG. 13 with a tractor and trailer unit illustrated schematically therein to assist in illustrating the "envelope" defined therebetween.

FIGS. 10, 11 and 12 depict details of a preferred embodiment of the unitary engine driven synchronous generator 300. The generator 300 includes an outer stator assembly 302 that is fixedly attached to the bell housing 306 of a suitable prime mover such as diesel engine 350. A rotor assembly 304 is affixed directly to the engine flywheel 310 to create a continuous drive connection between the engine drive shaft, the engine flywheel and the rotor assembly 304 of the generator. A cover 311 and a generator cooling fan 315 have been removed from FIG. 12 to show the details of the rotor 304.

The stator assembly 302 includes a core section 314, which may be fabricated from ferrus laminations or powdered metal. A main winding 316 that provides primary power to the refrigeration system and an auxiliary winding 318 that is electrically connected to a battery charging device are disposed in slots in the stator core 314 in a conventional matter. Attachment of the stator assembly 302 to the bell housing 306 is accomplished by use of a series of elongated threaded fasteners 320 passing through mating openings 322 in the stator core 314. The fasteners 320 in turn pass through axially aligned openings 324 provided in an adapter plate 326 and thence into axially aligned threaded openings 328 in the bell housing 326.

As best seen in FIGS. 10 and 11, the rotor assembly 304 includes a steel rotor hub 330. As best seen in FIG. 10, the rotor hub has a substantially square cross-section and inlcudes a plurality of axial openings 332 therethrough, which are adapted to receive a plurality of elongated threaded fasteners 334 therethrough. The threaded fasteners 334 are adapted to be received in axially aligned threaded openings 336 provided in the engine flywheel 310, as best seen in FIG. 12, to thereby provide the integral connection between the rotor assembly 304 and the engine flywheel and drive shaft.

Mounted to the four outside surfaces 338 of the rotor hub 330 are four rotor magnets 340 that are made from a high-magnetic flux density material. In the preferred embodiment, the four rotor magnets 340 are Neodynium iron boron permanent magnets. It should be understood that other magnetic materials having the necessary flux density, when properly applied to account for thermal characteristics, may also be employed to provide the necessary power capabilities. Mounted on the outer surfaces 342 of each of the rotor magnets 340 are four non-magnetic spacers 344, which as seen are circumferentially spaced evenly about the rotor hub 330 to assure a proper and reliable location of the permanent magnets 340 on the rotor assembly 304.

As a result of the above-described configuration, operation of the diesel engine 350 will result in rotation of the flywheel 310, which will likewise rotate the rotor assembly 304 and the rotor magnets 340 carried thereby, thereby inducing in the stator windings 316, 318, synchronous voltages in a manner well familiar to those skilled in the art of synchronous generator design. Such configuration results in an extremely small synchronous generator, which is capable of providing sufficient power to supply all the power requirements of a trailer refrigeration system, as discussed hereinabove.

The engine 350 illustrated in the preferred embodiment in this invention is a diesel engine of the type manufactured by Kubota Corporation as model number TVC2204, which is rated at 32 horsepower at 2200 r.p.m. It is should be understood that virtually any engine alternatives which meet the space requirements may be used to power the generator of the present invention. By way of example, the engine may comprise a diesel fueled piston engine, a gasoline fueled piston engine, a natural gas or propane fueled piston engine, piston engines which are two cycle or four cycle, turbine engines with various fuels, Sterling cycle engines or Wankel engines.

It should also be appreciated that while in the preferred embodiment, the engine is shown directly, coaxially connected to the generator, that it is contemplated that an intermediate power transmission device may result in coupling of the engine drive shaft to the generator rotor in a manner where the engine drive shaft and the rotor of the generator are not coaxial or colinear with one another. Various types of mechanical drive mechanisms including gear trains and other known mechanical drive devices may be used.

It should further be understood that while the rotor assembly 304 has been described in connection with a preferred embodiment and configuration of the rotor magnets 340, that other shapes of magnets and combinations of magnets and spacers 344 may be used to achieve a satisfactory level of power output from the generator. The only requirement is that a sufficient number of magnetic poles of sufficient flux density are defined to generate the required power. It is contemplate, for example, that the magnetic poles may be created by electromagnets.

Figure 15:
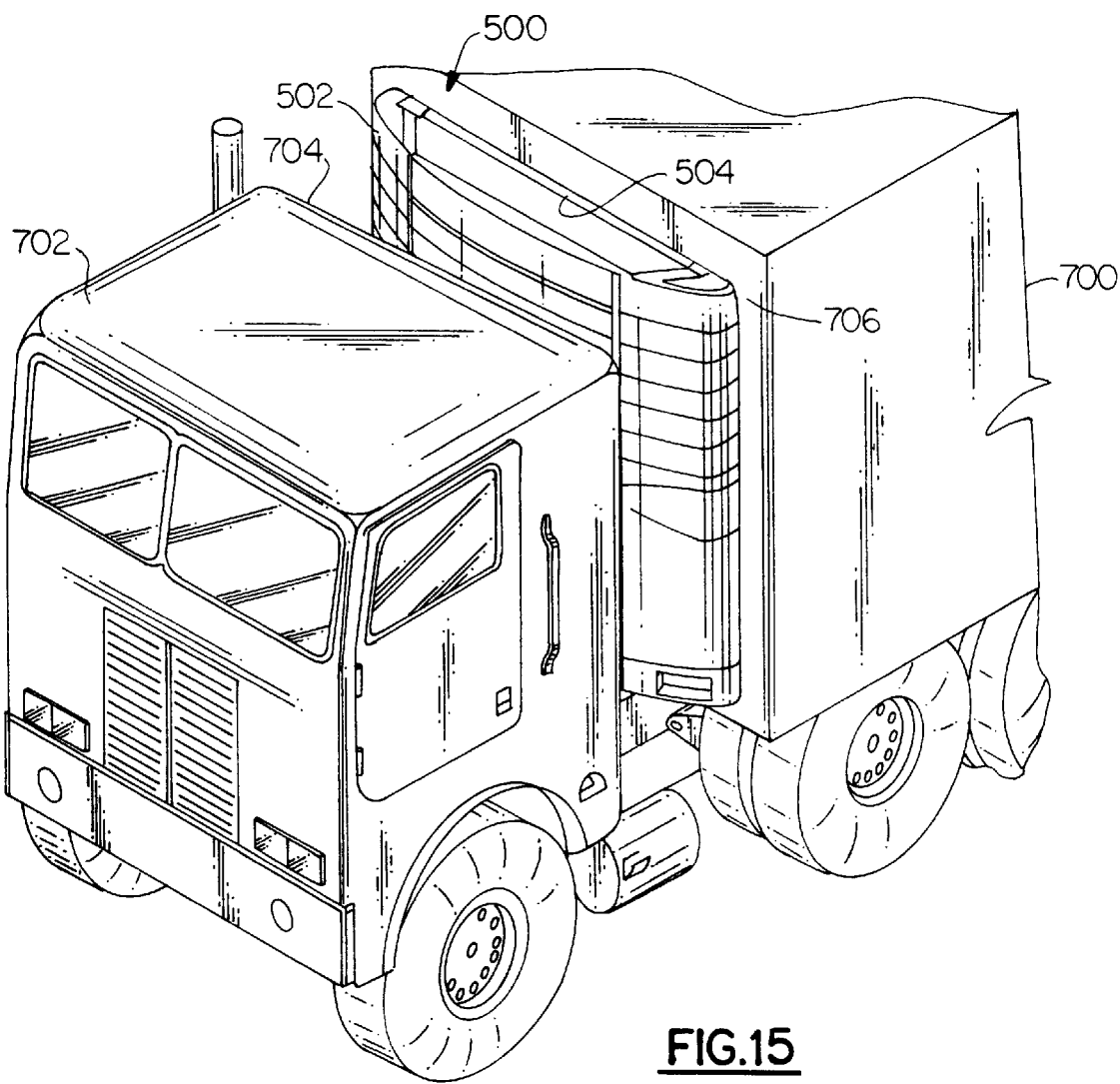
FIG. 15 illustrates a transport refrigeration unit of the present invention attached to a truck trailer in a manner well known in the art of transport refrigeration.

FIG. 15 illustrates the trailer refrigeration unit 500 depicted in FIGS. 7, 8 and 9 enclosed within an outer cover 502 and attached to a truck trailer 700 that is being towed by a truck 702. All of the components of the trailer refrigeration unit 700 are supported by a structural framework generally indicated by reference numeral 504 in FIGS. 7–9 and 13–15. The outer cover 502 is also structurally supported by the structural framework 504. As is common for transport refrigeration units, various panels of the outer cover are hinged and are removable to provide ready access to the refrigeration system to perform routine maintenance.

The illustrated tractor/trailer 702/700 combination is of the type previously referred to which satisfies the European standard, that such the combination not exceed 16.5 meters from the nose of the truck tractor unit 702 to the rear of the trailer unit 700. At the same time, the trailer 700 is of sufficient length to accommodate 33 European pallet loads of goods.

The relatively thin profile or depth of the refrigeration unit 500 allows the distance between the back 704 of the tractor unit 702 and the front wall 706 of the refrigerated trailer 700 to be extremely small while still accommodating the turning radius of the tractor trailer combination. Such relationship is best seen with respect to the schematic representation of FIG. 14 where the back wall 74 of the tractor is represented by the line 704, and the front wall of the trailer by the line 706. The point 708 located along the centerline 707 of the trailer 700 represents the attachment/pivot point of the tractor 702 to the trailer 700. The arcuate line 711 extending between the radius lines 710 represents the swing radius of the back wall 704 of the tractor during the full range of turning capability of the tractor. It will be obvious from this illustration that the profile of the refrigeration unit 500, as defined by the outside surface of the outer cover 502, allows the relatively close spacing between the back wall 704 and the trailer front wall 706 while allowing clearance between the back wall 704 and the refrigeration unit 500 and its outer cover 502.

Having thus described the preferred embodiments in sufficient detail as to permit those of skill in the art to practice the present invention without undue experimentation, those of skill in the art will readily appreciate other useful embodiments within the scope of the claims hereto attached. For example, although the present invention has been described as useful in transport refrigeration systems, those of skill in the art will readily understand and appreciate that the present invention has substantial use and provides many benefits in other types of refrigeration systems as well. In general, the refrigeration industry would find the present invention useful in achieving reliable and efficient cooling for those products where high standards must be maintained and energy waste must be eliminated to preserve resources.

In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A transport refrigeration unit of the type configured to be mounted on the front wall of a transport trailer, the transport trailer being adapted to be connected to and towed by a motorized tractor, the connected trailer and tractor defining therebetween a predetermined envelope bounded by the tractor swing radius and the trailer front wall, said refrigeration unit comprising:

a structural support framework configured to be attached to the front wall of the transport trailer;

an outer cover configured to be supported by said framework and to be within said predetermined envelope; and the following component, all supported by said framework, and contained within said outer cover:

a compressor having a discharge port and a suction port and further having an electric compressor drive motor hermetically disposed therein for running the compressor;

a condenser heat exchanger unit operatively coupled to said compressor discharge port;

an evaporator heat exchanger unit operatively coupled to said compressor suction port;

at least one fan assembly having at least one electric fan motor configured to provide air flow over one of said heat exchanger units; and an integrally mounted unitary engine driven generator assembly configured to selectively produce at least one A.C. voltage at one or more frequencies;

wherein said generator assembly is configured to produce sufficient electric power to operate said compressor drive motor and said at least one fan motor.

2. The transport refrigeration unit of claim 1 wherein said generator is a synchronous generator.

3. The transport refrigeration unit of claim 2 wherein:

said integrally mounted unitary engine driven generator assembly comprises:

an engine having a rotating output element;

a generator having a rotor element; and means for driveably interconnecting said output element of said engine to said rotor element of said generator;

whereby mechanical energy is transferred from said engine to said generator to produce said at least one A.C. voltage at one or more frequencies.

4. The transport refrigeration unit of claim 3 wherein said engine comprises a diesel engine.

5. A transport refrigeration unit of the type configured to be mounted on the front wall of a transport trailer, the transport trailer being adapted to be connected to and towed by a motorized tractor, the connected trailer and tractor defining therebetween a predetermined envelope bounded by the tractor swing radius and the trailer front wall, said refrigeration unit comprising:

a structural support framework configured to be attached to the front wall of the transport trailer;

an outer cover configured to be supported by said framework and to be within said predetermined envelope; and the following component, all supported by said framework, and contained within said outer cover:

a compressor having a discharge port and a suction port and further having an electric compressor drive motor hermetically disposed therein for running the compressor;

a condenser heat exchanger unit operatively coupled to said compressor discharge port;

an evaporator heat exchanger unit operatively coupled to said compressor suction port;

at least one fan assembly having at least one electric fan motor configured to provide air flow over one of said heat exchanger units; and an integrally mounted unitary engine driven generator assembly configured to selectively produce at least one A.C. voltage at one or more frequencies;

wherein said at least one compressor drive motor and said at least one fan motor are configured to be directly coupled to said generator and to operate at a voltage and frequency produced by said generator.

6. The transport refrigeration unit of claim 5 wherein said generator is a synchronous generator.

7. The transport refrigeration unit of claim 6 wherein:

said integrally mounted unitary engine driven generator assembly comprises:

an engine having a rotating output element;

a generator having a rotor element; and means for driveably interconnecting said output element of said engine to said rotor element of said generator;

whereby mechanical energy is transferred from said engine to said generator to produce said at least one A.C. voltage at one or more frequencies.

8. The transport refrigeration unit of claim 7 wherein said engine comprises a diesel engine.

9. A transport refrigeration unit of the type configured to be mounted on the front wall of a transport trailer, the transport trailer being adapted to be connected to and towed by a motorized tractor, the connected trailer and tractor defining therebetween a predetermined envelope bounded by the tractor swing radius and the trailer front wall, said refrigeration unit comprising:

a structural support framework configured to be attached to the front wall of the transport trailer;

an outer cover configured to be supported by said framework and to be within said predetermined envelope; and the following component, all supported by said framework, and contained within said outer cover:

a compressor having a discharge port and a suction and further having an electric compressor drive motor hermetically disposed therein for running the compressor;

a condenser heat exchanger unit operatively coupled to said compressor discharge port;

an evaporator heat exchanger unit operatively coupled to the compressor suction port;

a condenser fan assembly including at least one electric fan motor configured to provide air flow over said condenser heat exchanger;

an evaporator fan assembly including at least one electric fan motor configured to provide air flow over said evaporator heat exchanger unit;

auxiliary electrical components associated with operation and control of said transport refrigeration system; and an integrally mounted unitary engine driven synchronous generator assembly configured to selectively produce at least one A.C. voltage at one or more frequencies;

wherein said compressor motor, said condenser fan motor, said evaporator fan motor, and said auxiliary electrical devices are configured to be directly coupled to said generator and to operate at a voltage and a frequency produced by said synchronous generator.

10. A transport refrigeration unit of the type configured to be mounted on the front wall of a transport trailer, which is adapted to be connected to and towed by a motorized tractor, the trailer and tractor combination being of the type referred to as a "European 33 Pallet Trailer Refrigeration Unit", the connected trailer and tractor defining a predetermined envelope bounded by the tractor swing radius and the 33 Pallet trailer front wall, said refrigeration unit comprising:

a structural support framework configured to be attached to the front wall of the transport trailer;

an outer cover configured to be supported by said framework and to be within said predetermined envelope; and the following component, all supported by said framework, and contained within said outer cover:

a compressor having a discharge port and a suction port and further having an electric compressor drive motor hermetically disposed therein for running the compressor;

a condenser heat exchanger unit operatively coupled to said compressor discharge port;

an evaporator heat exchanger unit operatively coupled to said compressor suction port;

at least one fan assembly having at least one electric fan motor configured to provide air flow over one of said heat exchanger units; and an integrally mounted unitary engine driven synchronous generator assembly configured to selectively produce at least one A.C. voltage at one or more frequencies;

wherein said at least one compressor drive motor and said at least one fan motor are configured to be directly coupled to said generator and to operate at a voltage and frequency produced by said synchronous generator.

\* \* \* \* \*